US012579967B2

(12) United States Patent
Fox-Rabinovitz et al.

(10) Patent No.:     US 12,579,967 B2
(45) Date of Patent:        Mar. 17, 2026

(54) INTERFERENCE DETERRENT SYSTEMS AND METHODS

(71) Applicant: Torc Robotics, Inc., Blacksburg, VA (US)

(72) Inventors: Joseph R. Fox-Rabinovitz, Blacksburg, VA (US); Akshay Pai Raikar, Blacksburg, VA (US); William Davis, Blacksburg, VA (US); Justin Yurkanin, Blacksburg, VA (US); Jenifer Flores, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 55 days.

(21) Appl. No.: 18/400,342

(22) Filed: Dec. 29, 2023

(65) Prior Publication Data

US 2025/0218421 A1     Jul. 3, 2025

(51) Int. Cl.
| | |
|---|---|
| *G10K 11/34* | (2006.01) |
| *G06V 20/58* | (2022.01) |
| *G08B 3/10* | (2006.01) |
| *G08B 5/22* | (2006.01) |
| *H04R 1/32* | (2006.01) |

(52) U.S. Cl.
CPC ............. *G10K 11/34* (2013.01); *G06V 20/58* (2022.01); *G08B 3/10* (2013.01); *G08B 5/22* (2013.01); *H04R 1/323* (2013.01)

(58) Field of Classification Search
CPC .......... G10K 11/34; G06V 20/58; G08B 3/10; G08B 5/22; H04R 1/323
See application file for complete search history.

(56) References Cited

U.S. PATENT DOCUMENTS

| | | | | |
|---|---|---|---|---|
| 5,515,026 | A | 5/1996 | Ewert | |
| 5,969,593 | A * | 10/1999 | Will | A01M 29/18 |
| | | | | 119/908 |
| 8,737,169 | B1 * | 5/2014 | DeWitt | A01M 29/18 |
| | | | | 367/139 |
| 9,855,890 | B2 * | 1/2018 | James | B60Q 1/50 |
| 9,928,734 | B2 * | 3/2018 | Newman | B60Q 5/005 |
| 10,139,827 | B2 | 11/2018 | Charette et al. | |
| 12,165,446 | B1 * | 12/2024 | Adams | G07C 5/006 |
| 2015/0343943 | A1 | 12/2015 | Thoday et al. | |
| 2018/0040240 | A1 * | 2/2018 | Newman | G08G 1/096775 |
| 2018/0154829 | A1 * | 6/2018 | Kentley-Klay | B60Q 5/006 |
| 2021/0287546 | A1 | 9/2021 | Englander et al. | |
| 2022/0348138 | A1 | 11/2022 | Gordon et al. | |

(Continued)

FOREIGN PATENT DOCUMENTS

| | | | | | |
|---|---|---|---|---|---|
| CN | 115743031 A | * | 3/2023 | ........... | B60R 25/305 |
| JP | 2023527567 A | * | 6/2023 | ............. | G08G 1/166 |
| WO | WO-2020145189 A1 | * | 7/2020 | ............. | B60Q 1/381 |

*Primary Examiner* — Daniel Pihulic
(74) *Attorney, Agent, or Firm* — Armstrong Teasdale LLP

(57) ABSTRACT

An interference deterrent system for an autonomous vehicle is provided. The interference deterrent system includes a directional speaker system and a processor configured to receive, from at least one sensor of the autonomous vehicle, sensor data, identify, from the sensor data, a potentially interfering actor, determine a location of the potentially interfering actor with respect to the autonomous vehicle, and control the directional speaker system to emit a sound targeted at the location of the potentially interfering actor.

20 Claims, 6 Drawing Sheets

(56) References Cited

U.S. PATENT DOCUMENTS

| | | |
|---|---|---|
| 2025/0124775 A1 | 4/2025 | Bunker et al. |
| 2025/0218235 A1* | 7/2025 | Fox-Rabinovitz ........................... G07C 9/00182 |
| 2025/0218421 A1* | 7/2025 | Fox-Rabinovitz ....... G08B 5/22 |
| 2025/0232663 A1* | 7/2025 | Petersen .............. G08B 25/008 |

* cited by examiner

RECEIVE, FROM A CAMERA OF THE AUTONOMOUS VEHICLE, AT LEAST ONE CAMERA IMAGE

IDENTIFY, FROM THE CAMERA IMAGE, A POTENTIALLY INTERFERING ACTOR

DETERMINE A LOCATION OF THE POTENTIALLY INTERFERING ACTOR WITH RESPECT TO THE AUTONOMOUS VEHICLE

CONTROL THE DIRECTIONAL SPEAKER SYSTEM TO EMIT A SOUND TARGETED AT THE LOCATION OF THE POTENTIALLY INTERFERING ACTOR

INTERFERENCE DETERRENT SYSTEMS AND METHODS

TECHNICAL FIELD

The field of the disclosure relates generally to autonomous vehicles and, more specifically, to an interference deterrent system for autonomous vehicles.

BACKGROUND OF THE INVENTION

As driverless vehicles become more prevalent, there will be an increasing number of interactions between them and living beings. These interactions may include wildlife on the roads, especially since virtual drivers can operate any time of day or night. Other interactions can include careless humans (e.g., children) or unattended pets. Unauthorized or malicious actors seeking to interfere with autonomous vehicle operation may also interact with a driverless vehicle with the intent of vandalism, theft, and damage. Even if the vehicle is parked in a well-lit area away from crowds, or at home, it may still need monitoring. Bad actors, such as criminals do not want to be caught, so deterring interference can reduce the likelihood of a vehicle being targeted.

There is a need to prevent using the autonomous vehicle as a tool to harm people and a source of valuable and vulnerable personal data, tricking autonomous vehicles to cause the autonomous vehicle to perform otherwise unplanned maneuvers, and hacking autonomous vehicles to control the autonomous vehicles remotely. Making the vehicle less appealing as a target can discourage malicious actors (such as humans that continue to approach after being informed of truck's presence), careless actors (such as children wandering near the truck), or non-human actors (such as pets or wildlife). In addition to identifying these actors, there is a need for vehicles to have a set of tools and behaviors for dealing with them.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect an interference deterrent system for an autonomous vehicle is provided, the interference deterrent system includes a processor configured to receive, from at least one sensor of the autonomous vehicle, sensor data including an actor, determine a trajectory of the actor based on the sensor data, identify the actor as a potentially interfering actor when the trajectory of the actor intersects with a location of the autonomous vehicle, when the actor is not a potentially interfering actor, initiate standby to await receipt of additional sensor data, and when the actor is a potentially interfering actor, identify a response to be executed by the autonomous vehicle.

In another aspect an interference deterrent method for an autonomous vehicle is provided. The interference deterrent method includes receiving, from at least one sensor of the autonomous vehicle, sensor data including an actor, determining a trajectory of the actor based on the sensor data, identify the actor as a potentially interfering actor when the trajectory of the actor intersects with a location of the autonomous vehicle, when the actor is not a potentially interfering actor, initiating standby to await receipt of additional sensor data, and when the actor is a potentially interfering actor, identifying a response to be executed by the autonomous vehicle.

In another aspect an autonomous vehicle is provided. The autonomous vehicle includes one or more sensors including at least one sensor. The autonomous vehicle further includes an interference deterrent system. The interference deterrent system includes a processor configured to receive, from the at least one sensor, sensor data including an actor, determine a trajectory of the actor based on the sensor data, identify the actor as a potentially interfering actor when the trajectory of the actor intersects with a location of the autonomous vehicle, when the actor is not a potentially interfering actor, initiate standby to await receipt of additional sensor data, and when the actor is a potentially interfering actor, identify a response to be executed by the autonomous vehicle.

In another aspect, an interference deterrent system for an autonomous vehicle is provided. The interference deterrent system includes a directional speaker system and a processor configured to receive, from at least one sensor of the autonomous vehicle, sensor data, identify, from the sensor data, a potentially interfering actor, determine a location of the potentially interfering actor with respect to the autonomous vehicle, and control the directional speaker system to emit a sound targeted at the location of the potentially interfering actor.

In another aspect, an interference deterrent method for an autonomous vehicle is provided. The interference deterrent method includes receiving, from at least one sensor of the autonomous vehicle, sensor data, identifying, from the sensor data, a potentially interfering actor, determining a location of the potentially interfering actor with respect to the autonomous vehicle, and controlling a directional speaker system of the autonomous vehicle to emit a sound targeted at the location of the potentially interfering actor.

In another aspect, an autonomous vehicle is provided. The autonomous vehicle includes an interference deterrent system. The interference deterrent system includes at least one sensor, a directional speaker system, and a processor configured to receive, from the at least one sensor, sensor data, identify, from the sensor data, a potentially interfering actor, determine a location of the potentially interfering actor with respect to the autonomous vehicle, and control the directional speaker system to emit a sound targeted at the location of the potentially interfering actor.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
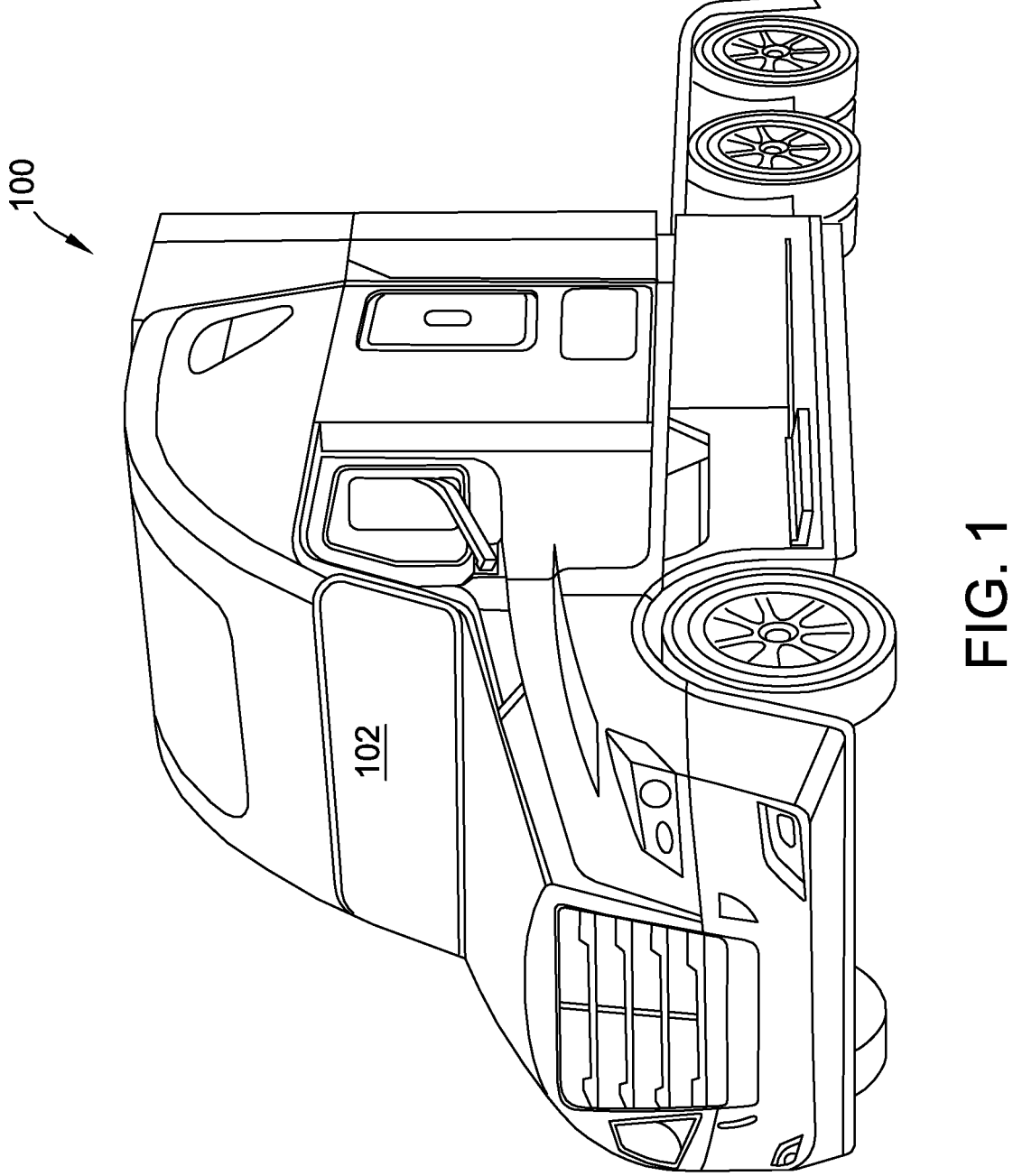
FIG. 1 is a diagram of an example autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

The embodiments described herein include an interference deterrent system that dissuades unauthorized persons or animals (sometimes referred to herein as "potentially interfering actors) from approaching or attempting to gain entry to an autonomous vehicle. In a second stage, if the actors continue to approach or behave inappropriately towards the vehicle, additional measures are taken. The interference deterrent system both notifies potentially interfering actors approaching the autonomous vehicle of the autonomous vehicle's or interference deterrent system's presence and actively discourages any interaction between potentially interfering actors and the autonomous vehicle. The interference deterrent system may work both when the autonomous vehicle is parked and when the autonomous vehicle is in motion.

The embodiments described herein include systems configured to notify approaching actors (e.g., persons or animals) of the presence of the autonomous vehicle and discouraging them from approaching/interfering. Example embodiments include mechanisms that generate high pitched or ultrasonic sound to scare wildlife and make unauthorized humans uncomfortable. High pitched sounds travel less far than low pitched sounds in air, ensuring a limited envelope of discomfort. In some embodiments, directional or localized projection is also possible, for example, by causing interference patterns between multiple sound projectors around the autonomous vehicle. In such embodiments, the sound can be targeted toward a determined location of a potentially interfering actor. In some embodiments, the system may generate an audible notification that the person is being recorded by the vehicle and that data is being transmitted for live monitoring, simulate verbally calling for help, or generate a recognizable alarm sound to create a strong psychological deterrent. In some embodiments, the system may include bright lights, which may be positioned on a swivel mount to be shined directly at the target. This will help illuminate the target for recording purposes, make it difficult for the approaching actor to see the truck, and can notify surrounding public of interference, creating a strong psychological deterrent. In some embodiments, a loud alarm is triggered whenever an unauthorized attempt is made to open any access panel or door or when the vehicle systems are engaged unexpectedly. In some embodiments, the system includes touch sensors (infrared or surface acoustic wave) placed at strategic locations around the autonomous vehicle body to detect undesirable contact and trigger an alarm. Some examples of an alarm include flashing or directional lights, speakers with voice calling for help or requesting actor to step back, another a recognizable sound, or a warning that emergency responders or mission control is being called. In some embodiments, detection of a malicious actor may additionally trigger a call to emergency personnel and/or operators of the autonomous vehicle and triggering image and sound recording of the actor. In some embodiments the system may detect a key, such as a radio frequency identification (RFID) tag, which may be carried by authorized personnel to allow authorized personnel to approach the vehicle without triggering the deterrent systems.

FIG. 1 is a diagram of an example embodiment of an autonomous vehicle 100. An autonomous vehicle 100 may have a driver or a passenger in a cab 102 of the autonomous vehicle 100. In certain embodiments, these vehicle occupants may take control of the vehicle and drive it manually. In autonomous embodiments that do not require the presence of a human driver, cab 102 may be omitted.

Figure 2:
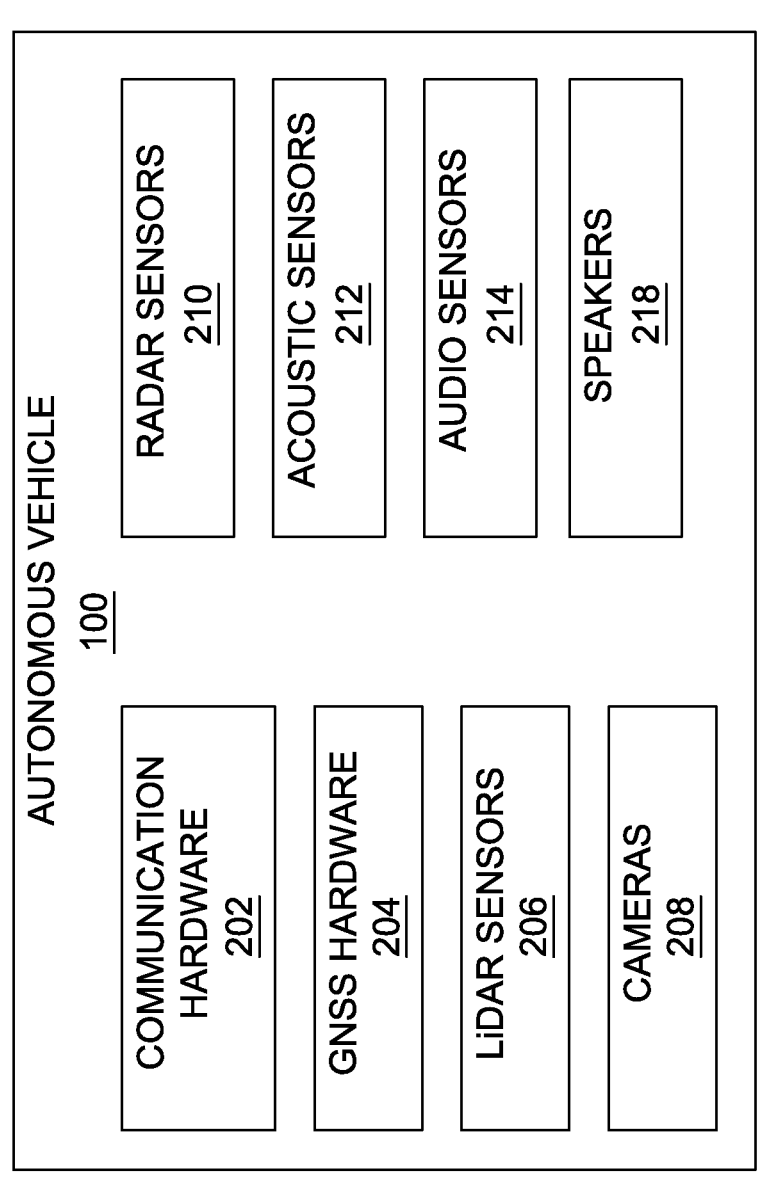
FIG. 2 is a block diagram of the autonomous vehicle shown in FIG. 1.

FIG. 2 is a block diagram of autonomous vehicle 100. As shown in FIG. 2, autonomous vehicle 100 includes various components for assisting autonomous operation such as, for example, communications hardware 202 (e.g., antennas, radio transmitters and receivers, or other associated circuitry), global navigation satellite system (GNSS) receivers 204 (e.g., antennas capable of receiving location, timing and velocity information from Global Positioning System (GPS) or other navigation satellite constellations), light detection and ranging (LiDAR) sensors 206, cameras 208, radio detection and ranging (RADAR) sensors 210, acoustic sensors 212 (e.g., ultrasound or sound navigation and ranging (SONAR) sensors), microphones or other audio sensors 214, and speakers 218.

In the example embodiment, at least some of speakers 218 form a directional speaker system, which may be used to discourage potentially interfering actors, such as unauthorized persons or animals, from approaching the vehicle. As described in further detail below with respect to FIGS. 4 and 5, in the example embodiment, autonomous vehicle 100 is configured to identify or determine a location of such potentially interfering actors with respect to autonomous vehicle 100. Autonomous vehicle 100 can control speakers 218 emit a sound targeted at the location of the potentially interfering actor to discourage the potentially interfering actor from approaching autonomous vehicle 100. For example, in some embodiments, speakers 218 form a speaker array, which when using beam-forming techniques can generate a desired interference pattern targeted at the potentially interfering actor. In other words, the generated interference pattern has a maximum amplitude at the location of the potentially interfering actor and less or minimal amplitude at other locations. In some embodiments, a frequency of the sound emitted by speakers 218 is selected based on attributes of the identified potentially interfering actor. For example, one or more audible frequencies may be selected if the identified potentially interfering actor is human, and one or more ultrasound frequencies (i.e., frequencies greater than 20 kilohertz, which are above a threshold of human hearing) may be selected is an animal.

Figure 3:
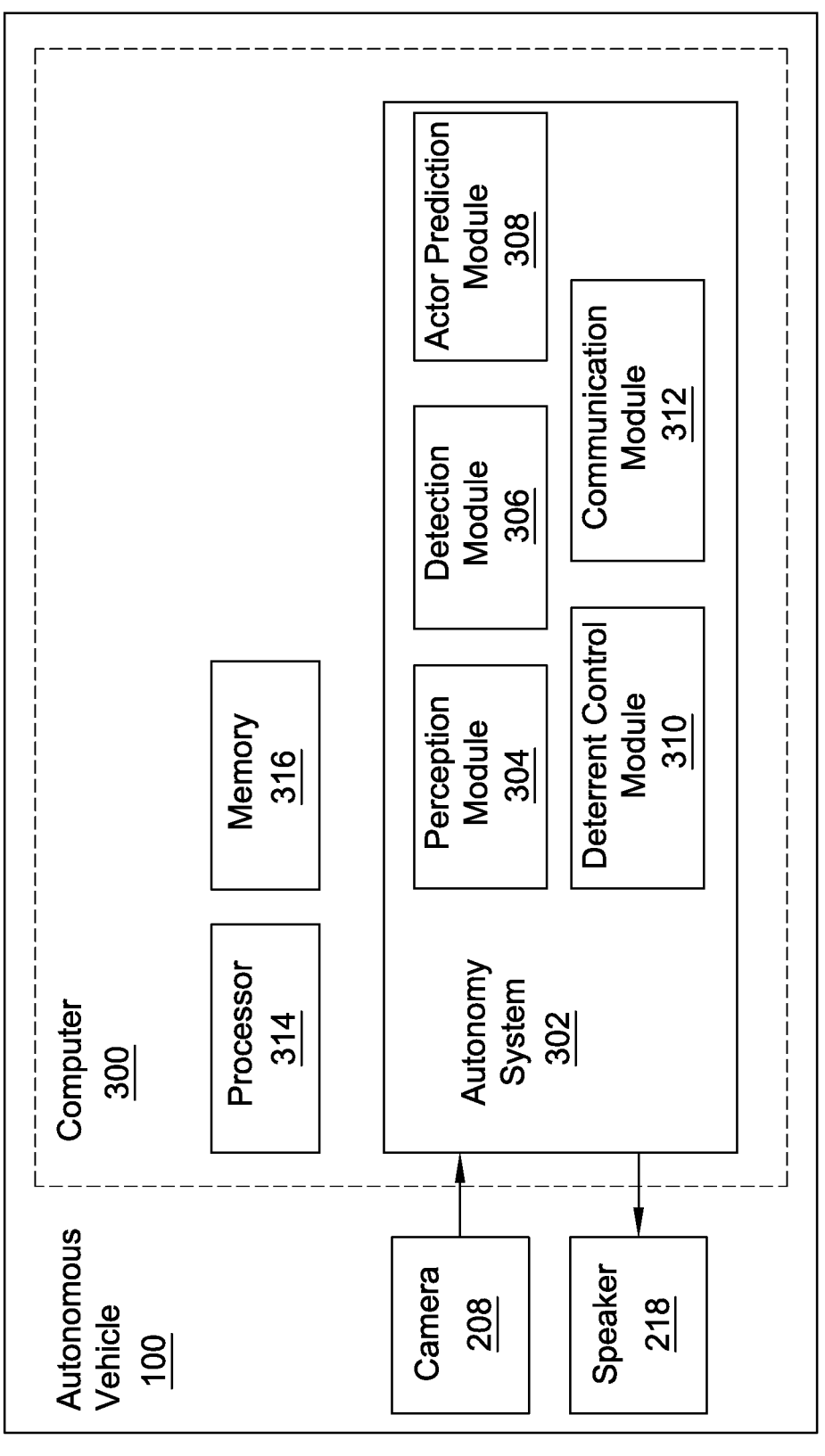
FIG. 3 is a diagram of an example interference deterrent system for the autonomous vehicle of FIG. 1.

FIG. 3 is an example diagram of autonomous vehicle 100 illustrating a perception system for performing image processing for autonomous vehicle 100. As shown in FIG. 3 autonomous vehicle 100 includes a computer 300, which may communicate with, for example, cameras 208, speakers 218, or other components and sensors of autonomous vehicle 100 described with respect to FIGS. 2 and 3. Computer 300 is configured to execute various hardware or software systems including an autonomy system 302, which is a collection of executable software modules including an perception module 304, a detection module 306, a actor prediction module 308, a deterrent control module 310, and a communication module 312, all described in further detail below. In some embodiments, computer 300 also performs additional functions of autonomous vehicle 100, such as autonomous driving functions. Computer 300 further includes a processor 314 and a memory 316. Processor 314 is configured to execute autonomy system 302, which in the example embodiment includes various computer-executable instructions stored in memory 316. While one computer 300, one processor 314, and one memory 316 are illustrated in FIG. 3, it should be understood that the functionality described herein can be performed by any number of computers 300, processors 314, or memories 316.

Autonomy system 302 analyzes camera images received from camera 208. In some embodiments, autonomy system 302 receives additional data from other sensors such as, for example, lidar sensors 106, radar sensors 210, fire detection sensors 212, or audio sensors 214, which autonomy system 302 may use to improve, annotate, or otherwise augment the captured images.

Perception module 304 is configured to identify one or more actors in camera images received by autonomy system 302 and to identify one or more attributes of the identified actors. For example, perception module 304 is configured to determine if any identified actors are a human or an animal. If the actor is human, perception module 304 may further determine the specific identity of the individual human or whether the human is a person authorized to interact with autonomous vehicle 100. If the actor is an animal, perception module 304 may further determine, for example, a type, size, or other information relating to the specific animal. In some embodiments, perception module 304 utilizes image processing techniques to determine whether an identified actor is animal or human. For example, portions of the captured image can be compared to reference images and a machine learning model may be trained using training images (e.g., of various humans and animals) to identify humans and animals in an input image.

Detection module 306 is configured to determine a location of any identified actors with respect to autonomous vehicle 100. For example, detection module 306 may generate a two-dimensional or three-dimensional map indicating locations of the identified actors with respect to autonomous vehicle 100. In some embodiments, detection module 306 utilizes image processing techniques to determine, for each actor, how far away and in which direction each identified actor is from autonomous vehicle 100. In some embodiments, detection module 306 uses additional sensor data, such as data received from lidar sensors 206 or radar sensors 210 to determine a location of each actor.

Actor prediction module 308 is configured to determine a trajectory, that is, a speed and direction of motion, of each of the identified actors. In some embodiments, actor prediction module 308 may utilize imaging processing techniques to determine a trajectory of the identified actors. For example, actor prediction module 308 may analyze an image to determine a current direction an actor is facing, and may compare a current image with previous images to determine a speed, acceleration, or any ongoing changes in direction of the identified actors. In some embodiments, actor prediction module 308 uses location information generated by detection module 306 to determine a trajectory of the identified actors. For example, for each identified actor, actor prediction module 308 may track a location of an actor as determined by detection module 306 through a sequence of images, and determine the trajectory of the actor based on the actor's change in location throughout the sequence of images.

Deterrent control module 310 is configured to determine whether any identified actors are potentially interfering actors that may interfere with autonomous vehicle 100 and to identify an appropriate response for each actor. In the example embodiment, deterrent control module 310 is configured to determine, based on information generated by detection module 306 and actor prediction module 308, whether the trajectory of the actor intersects (e.g., by coming within a threshold distance) with a location of autonomous vehicle 100, in which case deterrent control module 310 identifies the actor as a potentially interfering actor. When the actor is not a potentially interfering actor, deterrent control module 310 takes no immediate action with respect to that actor and perception stack stands by to await receipt of another camera image from camera 208. When the actor is identified as a potentially interfering actor, deterrent control module 310 identifies a response to be executed by the autonomous vehicle. When a response is determined, deterrent control module 310 is configured to control components of autonomous vehicle 100, such as speakers 218, by providing control signals to the components via communication module 312.

In some embodiments, deterrent control module 310 is further configured to, in response to a determination by perception module 304 that the potentially interfering actor is not human (i.e., an animal), determine whether to initiate an animal-specific response (sometimes referred to herein as an "animal response"). If no animal response is currently in progress, deterrent control module 310 is configured to initiate a response, such as a generating ultrasound to scare off animals. In some embodiments, if an animal response currently is in progress, control module is configured to determine whether to continue the response or initiate additional responses. For example, in some embodiments, deterrent control module 310 determines whether an ultrasound response has been activated for a threshold period of time, and if so, initiates additional animal responses such as, for example, audible alarms, directional speakers, or movement of autonomous vehicle 100 (e.g., braking or swerving). In some embodiments, as described above with respect to FIG. 2, the animal may include controlling speakers 108 using deterrent control module 310 to emit a sound (e.g., ultrasound) directed toward a location of the potentially interfering actor.

In some embodiments, deterrent control module 310 is further configured to, in response to a determination by perception module 304 that the potentially interfering actor is human, determine whether to initiate an human-specific response (sometimes referred to herein as an "human response"). If human response is currently in progress, deterrent control module 310 is configured to initiate a response. Examples of human responses include sounding audible alarms (e.g., horns, loudspeaker messages), lights (e.g., shining puddle lights on ground or directing search lights at the human), directional speakers, or movement of autonomous vehicle 100 (e.g., braking or swerving). In some embodiments, a human response is initiated only after determining the actor has an intent to interfere with autonomous vehicle 100, such as by intentionally moving towards autonomous vehicle 100. In some embodiments, as described above with respect to FIG. 2, the human response may include controlling speakers 108 using deterrent control module 310 to emit a sound (e.g., audible sound) directed toward a location of the potentially interfering actor.

In some embodiments, deterrent control module 310 is further configured to determine whether the approaching actor is authorized to interact with autonomous vehicle 100. For example, in some embodiments, autonomous vehicle 100 is capable of detecting an RFID key or tag that may be carried by an individual, and if such a key or tag is detected, deterrent control module 310 does not initiate or ceases any human responses. Additionally or alternatively, other mechanisms for identifying actors, such as facial recognition, may be used to identify an approaching actor to determine whether an approaching actor is authorized to interact with autonomous vehicle 100. In some embodiments, determining an actor is authorized may trigger additional welcoming responses of autonomous vehicle 100 such as, for example, unlocking doors, disabling alarms, or activating lights.

Figure 4A:
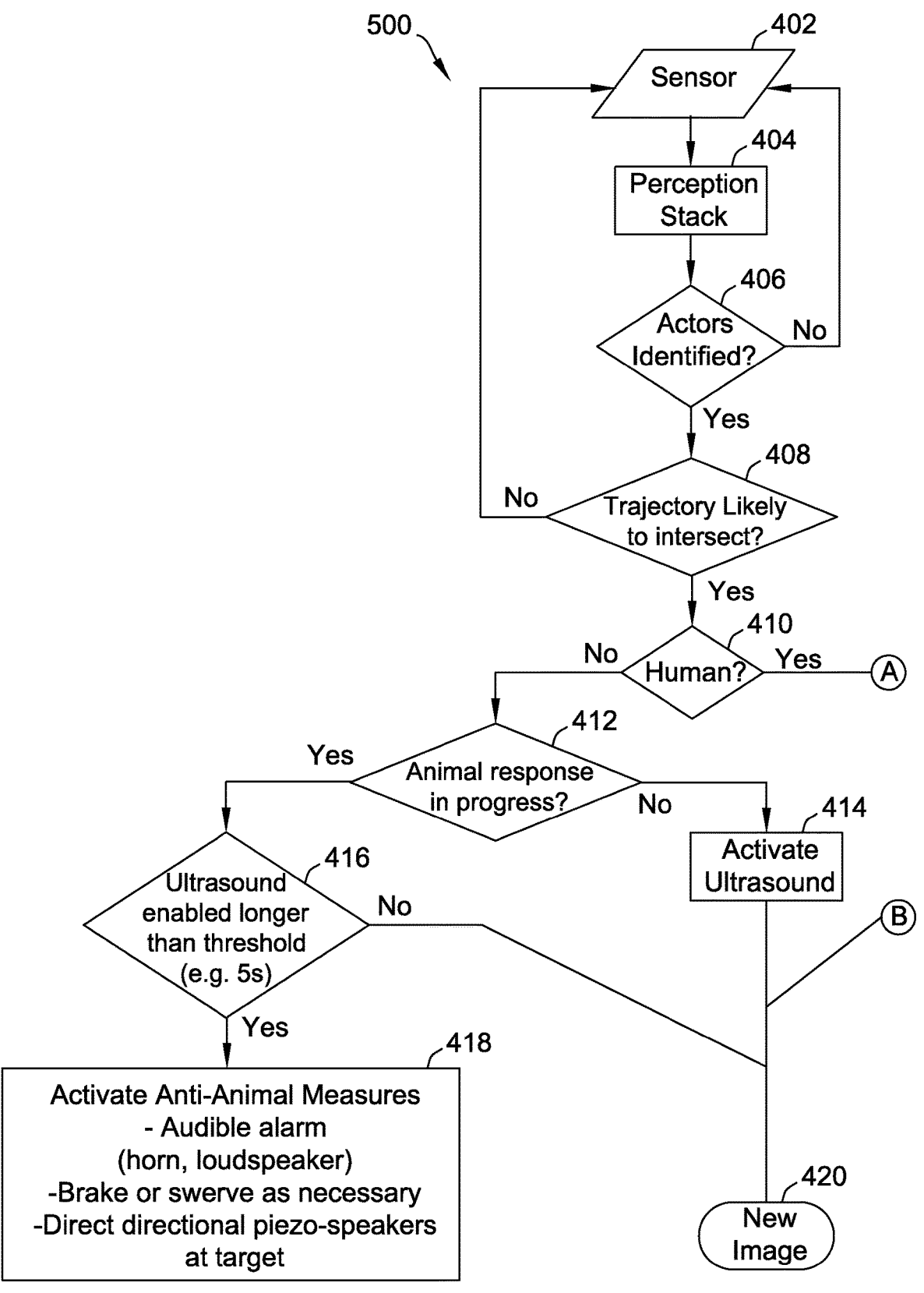
FIG. 4A is an example deterrent decision tree performed by an autonomy system for the autonomous vehicle in FIG. 1.
Figure 4B:
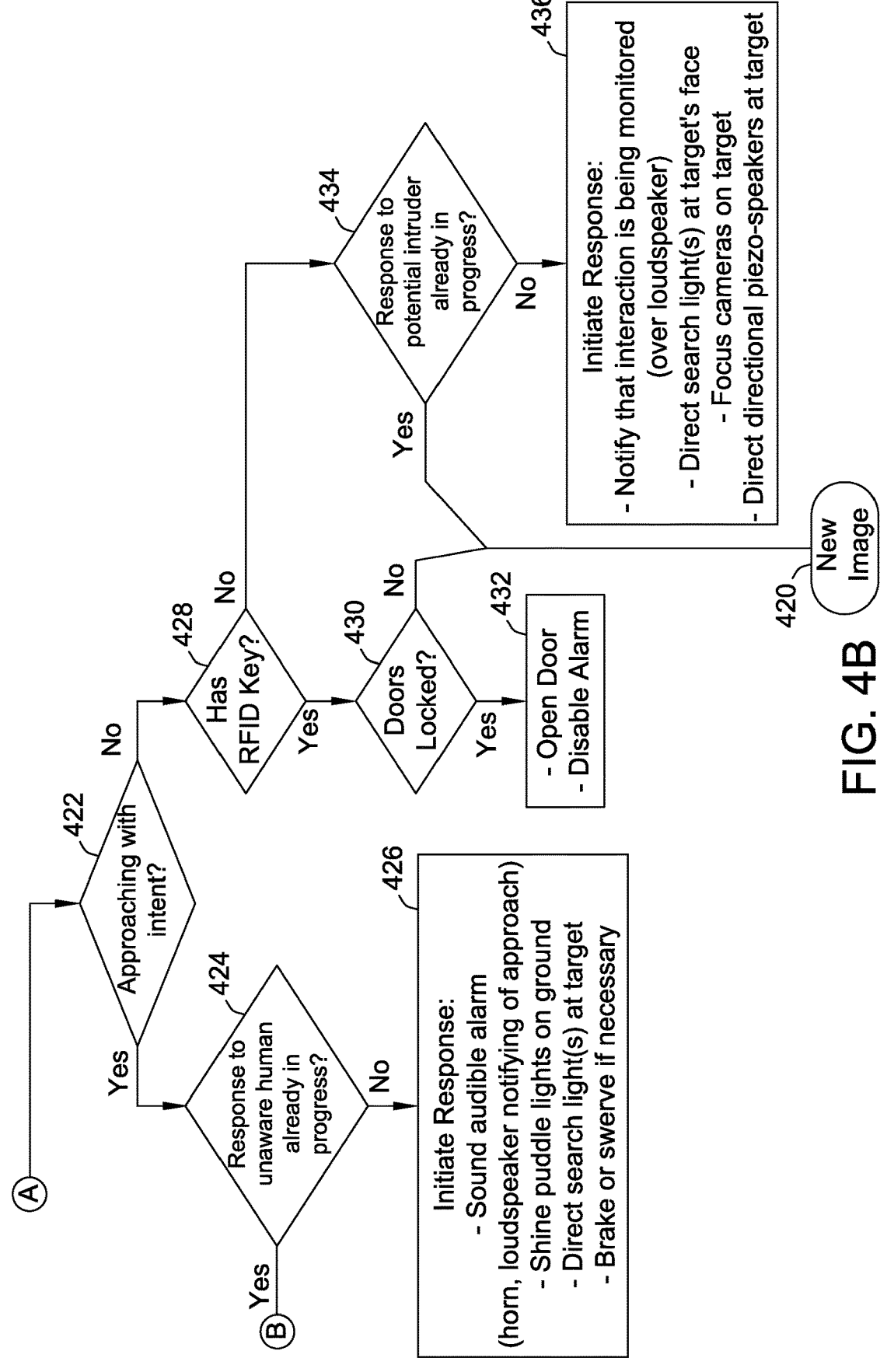
FIG. 4B is a continuation of the deterrent decision tree shown in FIG. 4A.

FIGS. 4A and 4B depict a decision tree illustrating an example process 400 for deterring interference with autonomous vehicle 100. Process 400 may be performed by processor 314 of computer 300 (shown in FIG. 3) executing autonomy system 302.

In the example embodiment, autonomy system 302 receives 402 one or more camera images from at least one of cameras 208. For example, autonomous vehicle 100 may periodically or intermittently capture images using cameras 208, or may receive a video stream from cameras 208. Such a video stream may be received continuously or for a predefined period, for example, following a detection of motion in a vicinity of autonomous vehicle 100. In some embodiments, data received from other sensors such as, for example, lidar sensors 106, radar sensors 210, fire detection sensors 212, or audio sensors 214 is used to improve, annotate, or otherwise augment the captured images.

In the example embodiment, perception stack applies 404 a perception stack to identify any actors, such as humans or animals, present in the captured image. The perception stack utilizes image processing techniques including, for example, machine learning techniques, to identify actors in an image and attributes of the identified actors such as, for example, a type of actor (e.g., a human or animal), an orientation or direction of the actor, or whether the actor is moving. In some embodiments, the perception stack utilizes facial recognition technology to identify individuals included in the image.

In the example embodiment, autonomy system 302 determines 406 if any actors are present in the captured image. If no actors are identified, the perception stack stands by until another image is captured. For each actor that is identified, autonomy system 302 determines 408 a trajectory of the actor and whether the determined trajectory is likely to intersect (e.g., by coming within a threshold distance of) a location or expected location of autonomous vehicle 100. If none of the identified actors have a trajectory that is likely to intersect autonomous vehicle 100, the perception stack stands by until another image is captured.

In the example embodiment, autonomy system 302 determines 410, for each actor having a trajectory that is likely to intersect autonomous vehicle 100, whether the actor is animal or human. As described in further detail below, autonomous vehicle 100 may respond differently depending on whether the actor is animal or human. As described above, autonomy system 302 may utilize image processing techniques to determine whether an identified actor is animal or human. For example, portions of the captured image can be compared to reference images or a machine learning model may be trained using training images (e.g., of various humans and animals) to identify humans and animals in an input image.

In the example embodiment, if it is determined the actor is an animal, autonomy system 302 determines 412, whether a prescribed response to the animal ("animal response") is already in progress. Examples of animal responses include ultrasound (i.e., generating sound above a human range of perception but audible to certain animals), audible alarms, directional speakers, or movement of autonomous vehicle 100 (e.g., braking or swerving). In some embodiments, if no animal response is in progress, autonomy system 302 activates 414 an emission of ultrasound to attempt to cause the animal to scare off or stop. In such embodiments, if the ultrasound has already been activated, autonomy system 302 determines 416 whether the ultrasound has been activated for longer than a threshold (e.g., 5 second) period of time. In such embodiments, if the ultrasound has been activated for the threshold period of time, autonomy system 302 activates 418 additional animal responses, for example, audible alarms, directional speakers, or movement of autonomous vehicle 100 (e.g., braking or swerving). Once any additional responses are activated, autonomy system 302 initiates standby 420 to await another image.

In the example embodiment, if it is determined the actor is a human, autonomy system 302 determines 422 if the human is approaching with intent, or in other words, if the human is intentionally approaching the autonomous vehicle 100 to interfere with or gain unauthorized entry to autonomous vehicle 100 rather than, for example, unintentionally crossing paths with autonomous vehicle 100 (e.g., due to coincidence or unawareness). In the example embodiment, if it is determined the human is approaching with intent, autonomy system 302 determines 424 if a response to the human actor ("human response") is underway. If a response is not underway, autonomy system 302 initiates 426 a human response. Examples of human responses include sounding audible alarms (e.g., horns, loudspeaker messages), lights (e.g., shining puddle lights on ground or directing search lights at the human), directional speakers, or movement of autonomous vehicle 100 (e.g., braking or swerving).

In some embodiments, if it is determined the actor is not approaching with intent, autonomy system 302 determines 428 whether the actor has an RFID key (e.g., using an RFID scanner of autonomous vehicle 100). In such embodiments, autonomy system 302 determines 430 if autonomous vehicle 100 is locked, and if so, unlock 432 autonomous vehicle 100 or disables any active alarms of autonomous vehicle 100. If no RFID key is detected, autonomy system 302 determines 434 if a human response is already in progress, and if not, initiates 436 a human response such as those described above.

Figure 5:
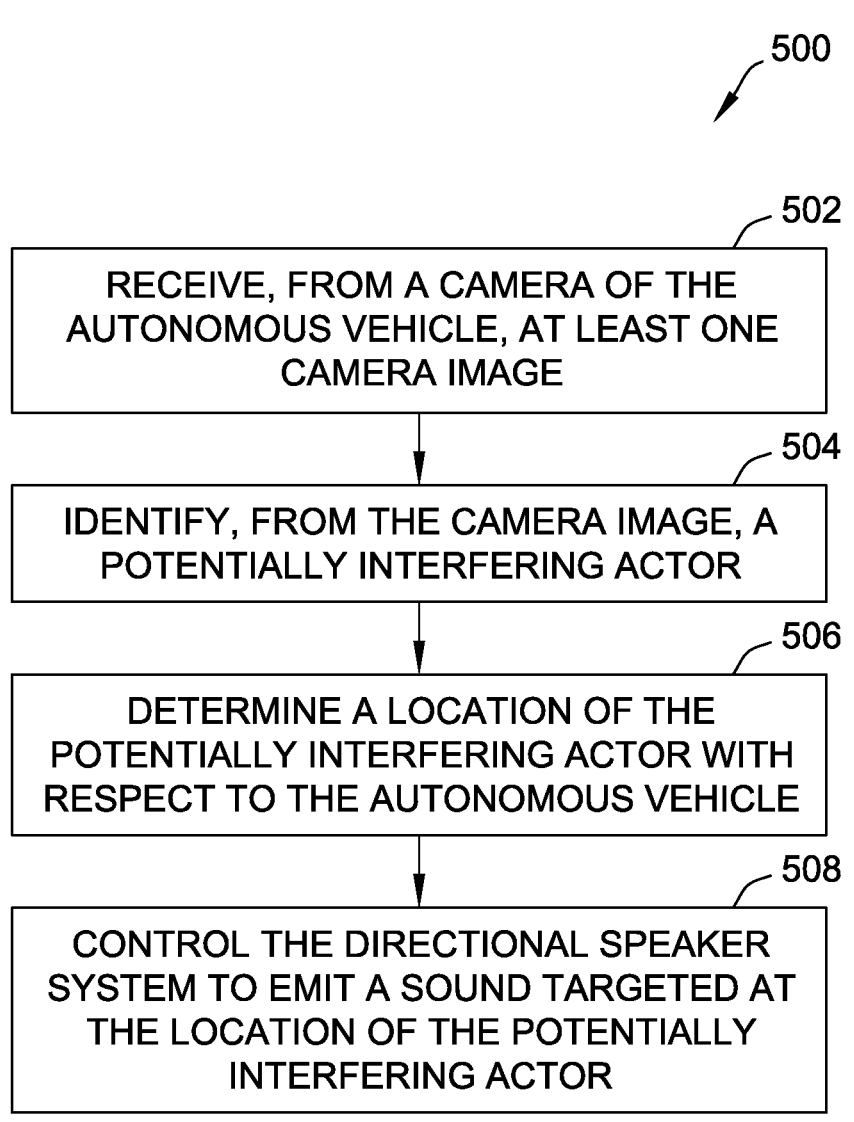
FIG. 5 is a flow chart of an example interference deterrent method performed by the system shown in FIG. 3.

FIG. 5 is a decision tree illustrating an example process 500 for deterring interference with autonomous vehicle 100. Process 500 may be performed by processor 314 of computer 300 (shown in FIG. 3).

In the example embodiment, processor 314 receives 502, from at least one sensor such as camera 208 of autonomous vehicle 100, sensor data (e.g., a camera image). In the example embodiment, processor 314 further identifies 504, from the sensor data, a potentially interfering actor. In the example embodiment, processor 314 further determines 506 a location of the potentially interfering actor with respect to autonomous vehicle 100. In the example embodiment, processor 314 further controls 508 the directional speaker system (e.g., speakers 218) to emit a sound targeted at the location of the potentially interfering actor.

An example technical effect of the methods, systems, and apparatus described herein includes at least one of: (a) determining when to initiate an interference deterring response by detecting a potentially interfering actor using a camera or other sensors of an autonomous vehicle to identify a location and trajectory of the potentially interfering actor; and (b) initiating a response such as emitting sound by a directional speaker system of an autonomous vehicle in response to identifying a potentially interfering actor.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or a electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An interference deterrent system for an autonomous vehicle, the interference deterrent system comprising:
   a directional speaker system; and
   a processor configured to:
      receive, from at least one sensor of the autonomous vehicle, sensor data;
      identify, from the sensor data, a potentially interfering actor;
      determine whether the identified potentially interfering actor is of a first type of actor or a second type of actor;
      select one or more frequencies based on whether the potentially interfering actor is the first type of actor or the second type of actor;
      determine a location of the potentially interfering actor with respect to the autonomous vehicle; and
      control the directional speaker system to emit a sound at the selected one or more frequencies and targeted at the location of the potentially interfering actor to discourage the potentially interfering actor from approaching the autonomous vehicle.

2. The interference deterrent system of claim 1, wherein the directional speaker system comprises an array of speakers, and wherein the processor is configured to control each speaker of the array of speakers to emit the sound with a desired interference pattern.

3. The interference deterrent system of claim 1, wherein the processor is further configured to identify an actor as the potentially interfering actor when a trajectory of the actor intersects with a location of the autonomous vehicle.

4. The interference deterrent system of claim 1, wherein the first type of actor is a human and the second type of actor is an animal.

5. The interference deterrent system of claim 4, wherein the processor is further configured to control the directional speaker system to emit the sound at a first one or more frequencies when the potentially interfering actor is the first type of actor and at a second one or more frequencies different from the first one or more frequencies when the potentially interfering actor is the second type of actor.

6. The interference deterrent system of claim 5, wherein the second one or more frequencies include at least one ultrasound frequency.

7. The interference deterrent system of claim 1, further comprising at least one loudspeaker, wherein the processor is further configured to control the loudspeaker to generate a verbal warning message when the potentially interfering actor is identified.

8. The interference deterrent system of claim 1, further comprising at least one warning light, wherein the processor is further configured to control the warning light to activate when the potentially interfering actor is identified.

9. An interference deterrent method for an autonomous vehicle, the interference deterrent method comprising:
   receiving, from at least one sensor of the autonomous vehicle, sensor data;
   identifying, from the sensor data, a potentially interfering actor;
   determining whether the identified potentially interfering actor is of a first type of actor or a second type of actor;
   selecting one or more frequencies based on whether the potentially interfering actor is the first type of actor or the second type of actor;

determining a location of the potentially interfering actor with respect to the autonomous vehicle; and
   controlling a directional speaker system of the autonomous vehicle to emit a sound at the selected one or more frequencies targeted at the location of the potentially interfering actor to discourage the potentially interfering actor from approaching the autonomous vehicle.

10. The interference deterrent method of claim 9, wherein the directional speaker system includes an array of speakers, and wherein the interference deterrent method further includes controlling each speaker of the array of speakers to emit the sound with a desired interference pattern.

11. The interference deterrent method of claim 9, further comprising identifying an actor as the potentially interfering actor when a trajectory of the actor intersects with a location of the autonomous vehicle.

12. The interference deterrent method of claim 9, wherein the first type of actor is a human and the second type of actor is an animal.

13. The interference deterrent method of claim 12, further comprising controlling the directional speaker system to emit the sound at a first one or more frequencies when the potentially interfering actor is the first type of actor and at a second one or more frequencies different from the first one or more frequencies when the potentially interfering actor is the second type of actor.

14. The interference deterrent method of claim 13, wherein the second one or more frequencies include at least one ultrasound frequency.

15. The interference deterrent method of claim 9, further comprising controlling a loudspeaker of the autonomous vehicle to generate a verbal warning message when the potentially interfering actor is identified.

16. The interference deterrent method of claim 9, further comprising controlling a warning light of the autonomous vehicle to activate when the potentially interfering actor is identified.

17. An autonomous vehicle comprising an interference deterrent system, the interference deterrent system comprising:
   at least one sensor;
   a directional speaker system; and
   a processor configured to:
      receive sensor data from the at least one sensor;
      identify, from the sensor data, a potentially interfering actor;
      determine whether the identified potentially interfering actor is of a first type of actor or a second type of actor;
      select one or more frequencies based on whether the potentially interfering actor is the first type of actor or the second type of actor;
      determine a location of the potentially interfering actor with respect to the autonomous vehicle; and
      control the directional speaker system to emit a sound at the selected one or more frequencies targeted at the location of the potentially interfering actor to discourage the potentially interfering actor from approaching the autonomous vehicle.

18. The interference deterrent system of claim 17, wherein the directional speaker system comprises an array of speakers, and wherein the processor is configured to control each speaker of the array of speakers to emit the sound with a desired interference pattern.

19. The autonomous vehicle of claim 17, wherein the processor is further configured to identify an actor as the potentially interfering actor when a trajectory of the actor intersects with a location of the autonomous vehicle.

20. The autonomous vehicle of claim 17, wherein the processor is further configured to: identify the potentially interfering actor as a human or an animal; and control the directional speaker system to emit the sound at a first one or more frequencies when the potentially interfering actor is the first type of actor and at a second one or more frequencies different from the first one or more frequencies when the potentially interfering actor is the second type of actor.

* * * * *